United States Patent
Miki

(10) Patent No.: US 8,557,362 B2
(45) Date of Patent: *Oct. 15, 2013

(54) OPTICAL RECORDING MEDIUM AND METHOD FOR MANUFACTURING THE SAME

(75) Inventor: Takeshi Miki, Tokyo (JP)

(73) Assignee: Sony Corporation, Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 13/202,256

(22) PCT Filed: Mar. 10, 2010

(86) PCT No.: PCT/JP2010/053955
§ 371 (c)(1),
(2), (4) Date: Aug. 18, 2011

(87) PCT Pub. No.: WO2010/106945
PCT Pub. Date: Sep. 23, 2010

(65) Prior Publication Data
US 2011/0300324 A1     Dec. 8, 2011

(30) Foreign Application Priority Data
Mar. 17, 2009  (JP) .................... 2009-064958

(51) Int. Cl.
*G11B 7/24*     (2013.01)

(52) U.S. Cl.
USPC .............. 428/64.1; 428/64.4; 430/270.12

(58) Field of Classification Search
USPC ................... 428/64.4; 430/270.12
See application file for complete search history.

(56) References Cited

U.S. PATENT DOCUMENTS

| 5,709,978 | A | 1/1998 | Hirotsune et al. |
| 5,912,104 | A | 6/1999 | Hirotsune et al. |
| 2007/0077521 | A1 | 4/2007 | Habuta et al. |
| 2009/0323495 | A1 | 12/2009 | Kitaura et al. |
| 2011/0044157 | A1* | 2/2011 | Miki et al. ............... 369/283 |
| 2011/0064903 | A1* | 3/2011 | Miki ........................ 428/64.4 |

FOREIGN PATENT DOCUMENTS

| JP | 7 223372 | 8/1995 |
| JP | 2000 190637 | 7/2000 |
| JP | 2004 174868 | 6/2004 |
| JP | 2007 157314 | 6/2007 |
| WO | 2006 043357 | 4/2006 |
| WO | 2007 063800 | 6/2007 |

OTHER PUBLICATIONS

International Search Report issued May 11, 2010 in PCT/JP10/53955 filed Mar. 10, 2010.

* cited by examiner

*Primary Examiner* — Elizabeth Mulvaney
(74) *Attorney, Agent, or Firm* — Oblon, Spivak, McClelland, Maier & Neustadt, L.L.P.

(57) ABSTRACT

The present invention provides an optical recording medium realizing reduced manufacturing cost of the optical recording medium. An optical recording medium 10 includes: a substrate 1; a recording layer 2 formed on the substrate 1, containing In, Sn, Pd, and oxygen, and containing oxygen atoms more than stoichiometric composition of the case where the In and the Sn are completely oxidized; and a light transmission layer 3 formed on the recording layer 2.

5 Claims, 3 Drawing Sheets

OPTICAL RECORDING MEDIUM AND METHOD FOR MANUFACTURING THE SAME

TECHNICAL FIELD

The present invention relates to an optical recording medium and a method for manufacturing the same and, more particularly, is suitably applied to a recordable optical recording medium.

BACKGROUND ART

In a conventional recordable optical disc using a red laser, an organic coloring material is used for a recording layer.

However, there is no proper organic coloring material capable of receiving a blue laser in a recordable optical disc using a blue laser, so that use of an inorganic material is examined.

In the case of using an inorganic material, it is proposed to form a recording layer by a multilayer film in order to obtain sufficient reflectance and release heat generated by laser irradiation (refer to, for example, patent document 1).

CITATION LIST

Patent Document

Patent document 1: Japanese Unexamined Patent Application Publication No. 2007-157314

SUMMARY OF THE INVENTION

However, when a recording layer is formed by a multilayer film, it takes time to form the multilayer film, and an expensive film forming apparatus having some film forming chambers is necessary.

Consequently, the manufacturing cost of an optical disc increases.

To solve the above-described problems, the present invention provides an optical recording medium realizing reduction in its manufacturing cost and a method of manufacturing the same.

An optical recording medium according to an embodiment of the present invention includes: a substrate; a recording layer formed on the substrate, containing In, Sn, Pd, and oxygen, and containing oxygen atoms more than stoichiometric composition of the case where the In and the Sn are completely oxidized; and a light transmission layer formed on the recording layer.

An embodiment of the present invention relates to a method of manufacturing an optical recording medium in which a recording layer is formed on a substrate and an optical transmission layer is formed on the recording layer. The method includes the step of forming a recording layer containing In, Sn, Pd, and oxygen on a substrate by sputtering while passing oxygen gas using an $In_2O_3$ target, an $SnO_2$ target, and a Pd target.

In the configuration of the optical recording medium, the content of oxygen in the recording layer containing In, Sn, Pd, and oxygen is larger than stoichiometric composition of the case where In and Sn are completely oxidized. Consequently, oxygen atoms are bonded to at least a part of Pd atoms, and the state of bonding between Pd and oxygen can be controlled by the content of oxygen or the like, so that the transmittance and reflectance of the recording layer can be controlled to desired values.

The recording layer containing In, Sn, Pd, and oxygen can be constructed only by a single layer. The number of layers constructing the recording layer can be reduced as compared with that in the case where a multilayer film of an in organic material is employed as the recording layer.

According to the method of manufacturing an optical recording medium, in the step of forming the recording layer by sputtering, by passing oxygen gas, the state of bonding between Pd and oxygen in the recording layer containing In, Sn, Pd, and oxygen can be controlled. Consequently, the transmittance and reflectance of the recording layer can be controlled to desired values.

In the optical recording medium according to an embodiment of the present invention, the state of bonding between Pd and oxygen can be controlled by the content of oxygen or the like, so that the transmittance and reflectance of the recording layer can be controlled to desired values.

In the method of manufacturing the optical recording medium according to an embodiment of the invention, the transmittance and reflectance of the recording layer can be controlled to desired values.

Therefore, by optimizing the transmittance and reflectance of the recording layer in accordance with the present invention, an optical recording medium having excellent recording characteristics can be realized.

In the present invention, since the recording layer containing In, Sn, Pd, and oxygen is formed, the recording layer can be constructed only by a single layer. Therefore, the number of layers constructing the recording layer is reduced, and the manufacturing cost of the optical recording medium can be reduced.

DESCRIPTION OF EMBODIMENTS

Figure 1:
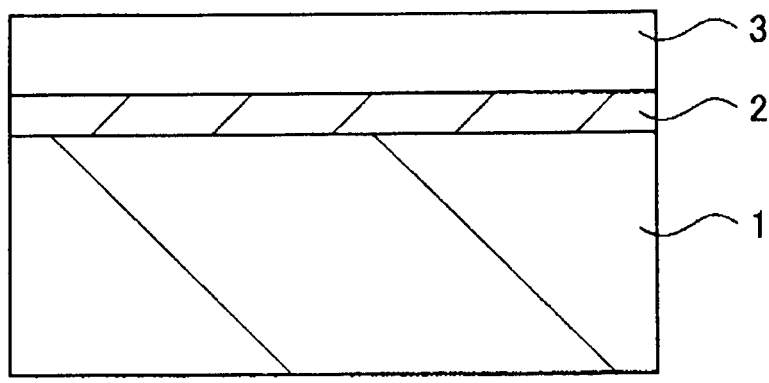
FIG. 1 is a schematic configuration diagram (cross section) of a first embodiment of an optical recording medium according to the present invention.

Best modes for carrying out the present invention (hereinbelow, called embodiments) will be described below.

The description will be given in the following order.
1. Summary of the invention
2. First embodiment
3. Second embodiment
4. Modification
5. Experimental example

1. Summary of the Invention

An optical recording medium of the present invention includes a substrate, a recording layer formed on the substrate, and a light transmission layer formed on the recording layer. The recording layer contains In, Sn, Pd, and oxygen, and content of oxygen is larger than stoichiometric composition of the case where In and Sn are completely oxidized.

A method of manufacturing an optical recording medium of the present invention is characterized in a step of forming a recording layer at the time of manufacturing an optical recording medium including a recording layer formed on a substrate and a light transmission layer formed on the recording layer. In the step of forming the recording layer, a recording layer containing In, Sn, Pd, and oxygen is formed by sputtering while passing oxygen gas using an $In_2O_3$ target, an $SnO_2$ target, and a Pd target.

In the optical recording medium of the present invention, as the material of the substrate, for example, a substrate material which is usually used for an optical recording medium such as an optical disc is used. A concrete example is polycarbonate resin.

In the optical recording medium of the present invention, the light transmission layer is a so-called cover layer.

At the time of recording/reading information, a laser beam is emitted to the recording layer from the side of the light transmission layer (cover layer).

As the material of the light transmission layer, for example, a material obtained by curing a UV resin (ultraviolet curable resin) with ultraviolet ray irradiation may be used.

The light transmission layer may be formed by applying the UV resin (ultraviolet curable resin) and curing the UV resin by irradiation of ultraviolet rays.

In the optical recording medium of the present invention, the recording layer contains In, Sn, Pd, and oxygen.

The content of each of the components of In, Sn, Pd, and oxygen is not particularly limited but may be set to arbitrary content.

The content of each of the components of the recording layer may be controlled by changing the materials and the parameters in the method of forming the recording layer. In the case of forming the recording layer by sputtering, the content may be controlled by changing parameters such as the composition of a target to be used, the amount of power applied to each of the targets, and the kind and flow rate of gas which is passed at the time of formation.

Since the recording layer in the optical recording medium of the invention contains In, Sn, Pd, and oxygen, by irradiating the recording layer with a laser beam or the like, the reflectance of the irradiated part is changed. Consequently, the part whose reflectance is changed and becomes different from that of the periphery is formed as a recording mark, so that information is recorded in the recording layer.

In the recording layer of the optical recording medium of the present invention, the content of oxygen is larger than the stoichiometric composition of the case where In and Sn are completely oxidized. Consequently, oxygen atoms are bonded to at least a part of Pd atoms contained in the recording layer. Since the state of bonding between Pd and oxygen can be controlled by the content of oxygen or the like, the transmittance and reflectance of the recording layer can be controlled to desired values by controlling the state of bonding between Pd and oxygen.

At this time, the Pd atoms in the recording layer are in three states; a (Pd) state where a Pd atom exists by itself and is not bonded to an oxygen atom, a (PdO) state where a Pd atom is bonded to a single oxygen atom, and a ($PdO_2$) state where a Pd atom is bonded to two oxygen atoms. Depending on the content of oxygen, one state, two states, or all of the three states exist.

When the ratio of Pd atoms in a state where they are not bonded to oxygen atoms is high, a metallic characteristic is strong, so that the transmittance of the recording layer is low and the reflectance of the recording layer is high. On the other hand, when the ratio of Pd atoms in a state where they are bonded to oxygen atoms is high, a characteristic of an oxide is strong, so that the transmittance of the recording layer is high, and the reflectance of the recording layer is low.

When the oxygen gas is passed at the time of forming the recording layer containing In, Sn, Pd, and oxygen by sputtering, the content of oxygen in the recording layer which is formed can be controlled by the flow rate of the oxygen gas. Consequently, the state of bonding between Pd and oxygen in the recording layer can be controlled.

Although the flow rate of the oxygen gas may be set to an arbitrary flow rate, more preferably, the flow rate of the oxygen gas is set to a range from 10 sccm to 100 sccm both inclusive.

In the case of considering increase in capacity of the optical recording medium, by making the recording layer as a dual layer, the capacity is naturally doubled. In an optical disc at present, the recording capacity in the case of a single-layer structure is 25 GB and that in the case of a double-layer structure is 50 GB.

To realize a multilayered optical recording medium having two or more recording layers, it is very important to control the reflectance and transmittance of the recording layer on the most light incident side, that is, on the most light transmission layer side. By controlling the reflectance and the transmission of the recording layer, data can be recorded excellently on another recording layer on the substrate side.

In the method of manufacturing an optical recording medium of the present invention, in the case of forming two or more recording layers, at the time of forming at least one recording layer, a recording layer containing In, Sn, Pd, and oxygen is formed by sputtering while passing oxygen gas. In such a manner, the transmittance and reflectance of the recording layer can be controlled to desired values.

In the case of providing two or more recording layers, at least one recording layer has the configuration of the recording layer according to the present invention, that is, the recording layer containing In, Sn, Pd, and oxygen and whose content of oxygen is larger than the stoichiometric composition of the case where In and Sn are completely oxidized.

The configuration and the forming method of the other recording layers are not limited.

As another recording layer, a recording layer similarly containing In, Sn, Pd, and oxygen or a recording layer made of different materials and of a different recording method may be used.

In the case of using two or more recording layers each containing In, Sn, Pd, and oxygen including another (other) recording layer(s), the recording capacity of a recordable type can be increased. In this case, by changing the flow rate of oxygen gas for each of the recording layers, the transmittance and reflectance can be also changed.

The recording layer containing In, Sn, Pd, and oxygen in the present invention is suitably used as a recording layer of a recordable type which is written only once.

The recording layer containing In, Sn, Pd, and oxygen can be constructed by a single layer, so that the number of layers constructing the recording layer can be reduced as compared with the case where a multilayer film of inorganic materials is employed as the recording layer. Consequently, by reducing the material cost and the manufacture cost of the optical recording medium, the optical recording medium can be constructed at low cost.

The optical recording medium of the present invention is formed in a disc shape which is usually employed as an optical recording medium, or other shapes such as a card shape.

2. First Embodiment

FIG. 1 is a schematic configuration diagram (cross section) of a first embodiment of an optical recording medium of the present invention.

An optical recording medium 10 is constructed by forming a recording layer 2 for recording information on a substrate 1 and forming a light transmission layer 3 on the recording layer 2.

The optical recording medium 10 can be formed in a disc shape like an existing optical disc. Another shape such as a card shape may be also employed for the optical recording medium 10.

As the material of the substrate 1, for example, polycarbonate resin may be used.

As the material of the light transmission layer (so-called cover layer) 3, for example, a material obtained by curing a UV resin (ultraviolet curable resin) with ultraviolet irradiation can be used.

In the optical recording medium 10 of the embodiment, particularly, the recording layer 2 contains In, Sn, Pd, and oxygen, and the content of oxygen is larger than stoichiometric composition of the case where In and Sn are completely oxidized.

Such a recording layer 2 can be formed, for example, by sputtering by passing oxygen gas using an $In_2O_3$ target, an $SnO_2$ target, and a Pd target.

Since the content of oxygen in the recording layer 2 is larger than the stoichiometric composition of the case where In and Sn are completely oxidized, oxygen atoms are bonded to at least a part of Pd atoms contained in the recording layer 2.

Since the state of bonding between Pd and oxygen can be controlled by the content of oxygen or the like, the transmittance and reflectance of the recording layer 2 can be controlled to desired values by controlling the state of bonding between Pd and oxygen.

For example, the optical recording medium 10 of the embodiment can be manufactured as follows.

First, for example, the substrate 1 made of polycarbonate resin is prepared. In the case of, for example, forming the optical recording medium 10 in a disc shape, the substrate 1 having the surface in which a groove for tracking is formed is produced.

Next, the recording layer 2 containing In, Sn, Pd, and oxygen is formed on the substrate 1 by sputtering while passing oxygen gas using an $In_2O_3$ target, an $SnO_2$ target, and a Pd target.

Subsequently, a UV resin (ultraviolet curable resin) is applied on the recording layer 2. After that, the UV resin is cured with ultraviolet irradiation, thereby forming the light transmission layer 3.

In such a manner, the optical recording medium 10 illustrated in FIG. 1 can be manufactured.

In the optical recording medium 10 of the foregoing embodiment, the content of oxygen in the recording layer 2 is larger than the stoichiometric composition of the case where In and Sn are completely oxidized. Consequently, oxygen atoms are bonded to at least a part of Pd atoms contained in the recording layer 2. Since the state of bonding between Pd and oxygen can be controlled by the content of oxygen or the like, the transmittance and reflectance of the recording layer 2 can be controlled to desired values by controlling the state of bonding between Pd and oxygen.

The recording layer 2 containing In, Sn, Pd, and oxygen can be constructed by a single layer, so that the number of layers constructing the recording layer 2 can be reduced as compared with the case where a multilayer film of inorganic materials is employed as the recording layer. Consequently, by reducing the material cost and the manufacture cost of the optical recording medium 10, the optical recording medium 10 can be constructed at low cost.

According to the above-described method of manufacturing the optical recording medium 10 of the embodiment, the recording layer 2 containing In, Sn, Pd, and oxygen is formed by sputtering while passing oxygen gas.

By passing oxygen gas as described above, the state of bonding between Pd and oxygen in the recording layer 2 can be controlled. Accordingly, the transmittance and reflectance of the recording layer 2 can be controlled to desired values.

Therefore, according to the embodiment, by optimizing the transmittance and reflectance of the recording layer 2, the optical recording medium 10 having excellent recording characteristics can be realized.

The optical recording medium 10 of the foregoing embodiment is constructed by the substrate 1, the recording layer 2, and the light transmission layer 3. In the present invention, however, the optical recording medium 10 may have other layers (for example, a protection layer) as long as the cost of the optical recording medium does not increase so much.

3. Second Embodiment

Figure 2:
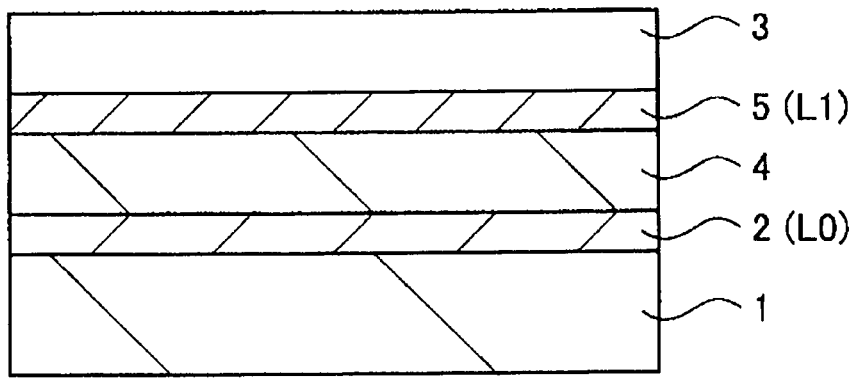
FIG. 2 is a schematic configuration diagram (cross section) of a second embodiment of the optical recording medium according to the present invention.

FIG. 2 is a schematic configuration diagram (cross section) of a second embodiment of an optical recording medium of the present invention.

An optical recording medium 20 is constructed by forming two recording layers 2 and 5 between the substrate 1 and the light transmission layer 3. An intermediate layer 4 is formed between the two recording layers 2 and 5.

The other configuration is similar to that of the optical recording medium 10 of the first embodiment illustrated in FIG. 1.

The recording layer 5 on the most light incident side, that is, on the side closest to the light transmission layer 3 serves as an L1 layer, and the lower recording layer 2 serves as an L0 layer.

As the material of the substrate 1 and the light transmission layer 3, a material similar to that of the optical recording medium 10 of the first embodiment can be used.

As the material of the intermediate layer 4, a material having high transmittance of a laser beam for recording data to the recording layers 2 and 5 is used. For example, a material obtained by curing a UV resin (ultraviolet curable resin) with ultraviolet irradiation can be used.

In the optical recording medium 20 of the embodiment, particularly, the recording layer (L1 layer) 5 on the side closest to the light transmission layer 3 contains In, Sn, Pd, and oxygen, and the content of oxygen is larger than stoichiometric composition of the case where In and Sn are completely oxidized.

The recording layer (L1 layer) 5 can be formed, for example, by sputtering by passing oxygen gas using an $In_2O_3$ target, an $SnO_2$ target, and a Pd target.

Since the state of bonding between Pd and oxygen can be controlled by the content of oxygen of the recording layer (L1 layer) 5 or the like, the transmittance and reflectance of the recording layer (L1 layer) 5 can be controlled to desired values by controlling the state of bonding between Pd and oxygen.

The configuration of the lower recording layer (L0 layer) 2 is not particularly limited.

The lower recording layer (L0 layer) 2 may be a recording layer containing In, Sn, Pd, and oxygen like the upper recording layer (L1 layer) 5 or a recording layer containing different materials or of a different recording method.

In the case of using, as the lower recording layer (L0 layer) 2, a recording layer containing In, Sn, Pd, and oxygen like the upper recording layer (L1 layer) 5, the capacity of a recordable type can be doubled.

In the case of using, as the lower recording layer (L0 layer) 2, a recording layer of a recording method (for example, a read-only recording layer or a rewritable recording layer) different from that of the upper recording layer (L1 layer) 5, the two recording layers 2 and 5 can realize different functions.

For example, the optical recording medium 20 of the embodiment can be manufactured as follows.

First, for example, the substrate 1 made of polycarbonate resin is prepared. In the case of, for example, forming the optical recording medium 10 in a disc shape, the substrate 1 having the surface in which a groove for tracking is formed is produced.

Next, the lower recording layer (L0 layer) 2 is formed on the substrate 1 by sputtering.

Subsequently, a UV resin (ultraviolet curable resin) is applied on the recording layer (L0 layer) 2. After that, the UV resin is cured with ultraviolet irradiation, thereby forming the intermediate layer 4.

On the intermediate layer 4, while passing oxygen gas using an $In_2O_3$ target, an $SnO_2$ target, and a Pd target, the upper recording layer (L1 layer) 5 containing In, Sn, Pd, and oxygen is formed.

Subsequently, a UV resin (ultraviolet curable resin) is applied on the recording layer (L1 layer) 5. After that, the UV resin is cured with ultraviolet irradiation, thereby forming the light transmission layer 3.

In such a manner, the optical recording medium 20 illustrated in FIG. 2 can be manufactured.

In the case of using, as the lower recording layer (L0 layer) 2, a recording layer containing In, Sn, Pd, and oxygen, by making the flow rate of gas in the L0 layer 2 and that in the L1 layer 5 different, the transmittance and reflectance of the recording layer 2 and those of the recording layer 5 can be made different from each other.

In the optical recording medium 20 of the embodiment, the content of oxygen in the recording layer (L1 layer) 5 is larger than the stoichiometric composition of the case where In and Sn are completely oxidized. Consequently, oxygen atoms are bonded to at least a part of Pd atoms contained in the recording layer (L1 layer) 5. Since the state of bonding between Pd and oxygen can be controlled by the content of oxygen or the like, the transmittance and reflectance of the recording layer (L1 layer) 5 can be controlled to desired values by controlling the state of bonding between Pd and oxygen.

The recording layer (L1 layer) 5 containing In, Sn, Pd, and oxygen can be constructed by a single layer, so that the number of layers constructing the recording layer 5 can be reduced as compared with the case where a multilayer film of inorganic materials is employed as the recording layer. Consequently, by reducing the material cost and the manufacture cost of the optical recording medium 20, the optical recording medium 20 can be constructed at low cost.

In the case where the lower recording layer (L0 layer) 2 also has the configuration containing In, Sn, Pd, and oxygen, the number of layers constructing the two recording layers 2 and 5 can be reduced. Consequently, the material cost and the manufacture cost of the optical recording medium 20 can be further reduced.

According to the above-described method of manufacturing the optical recording medium 20 of the embodiment, the recording layer (L1 layer) 5 containing In, Sn, Pd, and oxygen is formed by sputtering while passing oxygen gas.

By passing oxygen gas as described above, the state of bonding between Pd and oxygen in the recording layer (L1 layer) 5 can be controlled. Accordingly, the transmittance and reflectance of the recording layer (L1 layer) 5 can be controlled to desired values.

Therefore, according to the embodiment, particularly, the transmittance and reflectance of the recording layer 5 as the L1 layer can be optimized, and the optical recording medium 20 having the two recording layers 2 and 5 and having excellent recording characteristics can be realized.

The optical recording medium 20 of the foregoing embodiment is constructed by the five layers of the substrate 1, the recording layer 2, the intermediate layer 4, the recording layer 5, and the light transmission layer 3. In the present invention, however, the optical recording medium 20 may have other layers (for example, a protection layer) as long as the cost of the optical recording medium does not increase so much.

In the above description, the optical recording medium 20 of the embodiment has the upper recording layer (L1 layer) 5 as a recording layer containing In, Sn, Pd, and oxygen and the lower recording layer (L0 layer) 2 as a recording layer having an arbitrary configuration.

Alternatively, the lower recording layer (L0 layer) 2 may be a recording layer containing In, Sn, Pd, and oxygen, and the upper recording layer (L1 layer) may be a recording layer having an arbitrary configuration. The present invention includes such a configuration as well.

4. Modification

In the second embodiment, the recording layer has a two-layer structure. In the present invention, the recording layer may have a structure of three or more layers.

Figure 3:
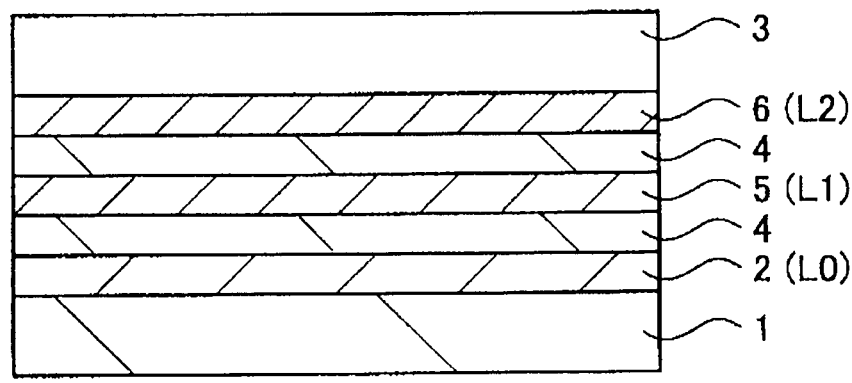
FIG. 3 is a schematic configuration diagram (cross section) of a modification of the second embodiment of the optical recording medium of the present invention.

FIG. 3 is a cross section of an optical recording medium having a structure of three recording layers as a modification of the second embodiment.

As illustrated in FIG. 3, an optical recording medium 30 is constructed by forming three recording layers 2, 5, and 6 between the substrate 1 and the light transmission layer 3. Between neighboring ones in the three recording layers 2, 5, and 6, the intermediate layer 4 is formed. The recording layer 6 as the uppermost layer which is closest to the light transmission layer 3 is an L2 layer, the recording layer 5 in the center serves as the L1 layer, and the lowest recording layer 2 serves as the L0 layer.

In the modification, it is sufficient to apply the configuration and the manufacturing method of the present invention described with respect to the recording layer (L1 layer) 5 in the second embodiment to at least one of the three recording layers 2, 5, and 6.

5. Experimental Examples

Experiment 1

Change in Characteristics of Optical Recording Medium According to Flow Rate of Oxygen Gas Practically, optical recording media was manufactured, and the reflectance and transmittance of a recording layer were examined.

Sample 1

The optical recording medium 10 of FIG. 1 was manufactured as follows.

As the substrate 1, a polycarbonate resin having a thickness of 1.1 mm of a disc shape was prepared.

Next, on the substrate 1, an In—Sn—Pd—O film having a thickness of 40 nm was formed as the recording layer 2 by sputtering. As targets, three targets of $In_2O_3$, $SnO_2$, and Pd were used. The flow rate of argon gas was set to 80 sccm, and the flow rate of oxygen gas was set to 20 sccm. The sputtering was carried out by adjusting the composition by controlling sputter power of each of the targets while passing the gases. The composition was adjusted so as to satisfy the relations $In_2O_3:SnO_2=9:1$ and $(In_2O_3+SnO_2):Pd=8:2$. In such a manner, the recording layer 2 as a single layer of the In—Sn—Pd—O film was formed.

Further, a ultraviolet curable resin was applied on the recording layer 2 and cured with ultraviolet irradiation to form the light transmission layer 3 having a thickness of 100 µm, thereby manufacturing the optical recording medium 10 having a disc shape and having the sectional structure illustrated in FIG. 1. The resultant was set as a sample 1 of the optical recording medium 10.

Sample 2

The optical recording medium 10 having the structure illustrated in FIG. 1 was manufactured in a manner similar to the sample 1 except that the flow rate of the argon gas was set to 70 sccm and that of oxygen gas was set to 30 sccm. The resultant was set as a sample 2 of the optical recording medium 10.

Sample 3

The optical recording medium 10 having the structure illustrated in FIG. 1 was manufactured in a manner similar to the sample 1 except that the flow rate of the argon gas was set to 60 sccm and that of oxygen gas was set to 40 sccm. The resultant was set as a sample 3 of the optical recording medium 10.

Evaluation of Recording Characteristics

The optical recording media of the samples 1 to 3 manufactured were irradiated with a laser beam to record information to the recording layer 2.

Concretely, information was recorded in continuous five tracks in the optical recording media 10 in 1× recording (1×: 4.92 m/s).

A jitter in the central track (the third track) was evaluated. The write power was changed and the jitter was measured at the changed write power.

Figure 4:
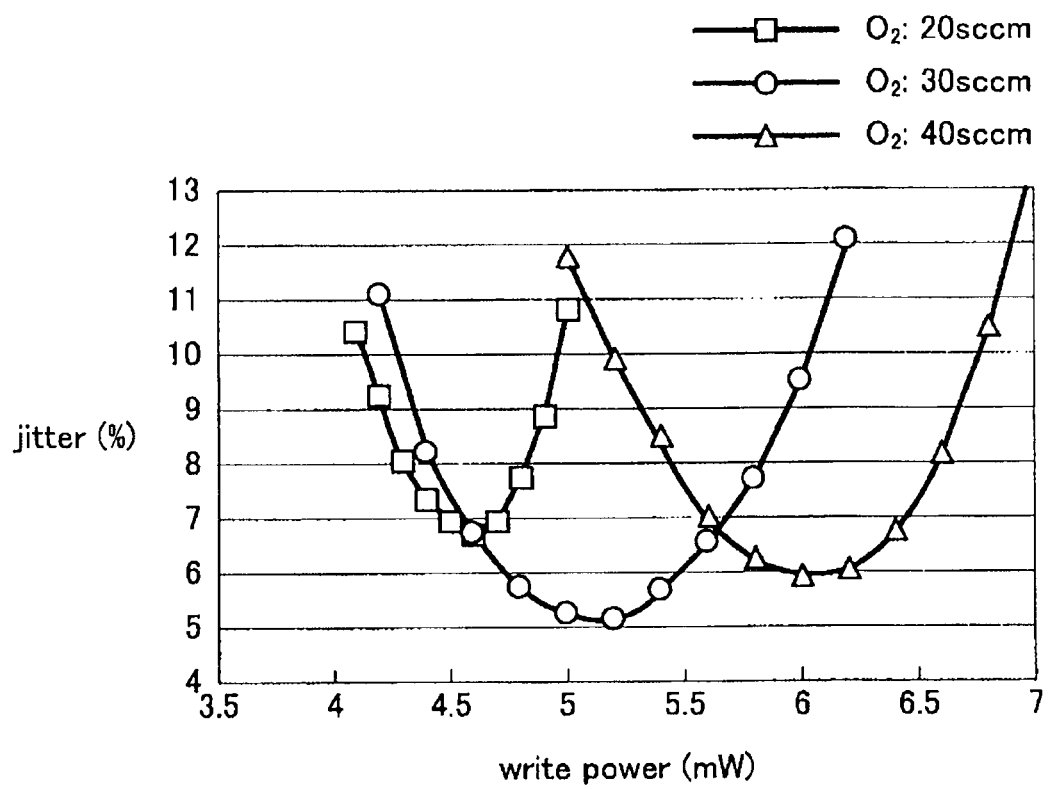
FIG. 4 is a diagram illustrating the relation between write power and jitter of each of samples.

As measurement results, the relations between the write powers of the samples and the jitter are illustrated in FIG. 4.

As illustrated in FIG. 4, it is understood that by increasing the flow rate of the oxygen gas and sufficiently supplying oxygen at the time of forming the recording layer while passing oxygen gas, a jitter is largely reduced. It is also understood that when the flow rate is increased from 20 sccm to 30 sccm, the curve extends transversely, and the write power margin is greatly enlarged.

The degree of modulation of each of the samples was measured.

Figure 5:
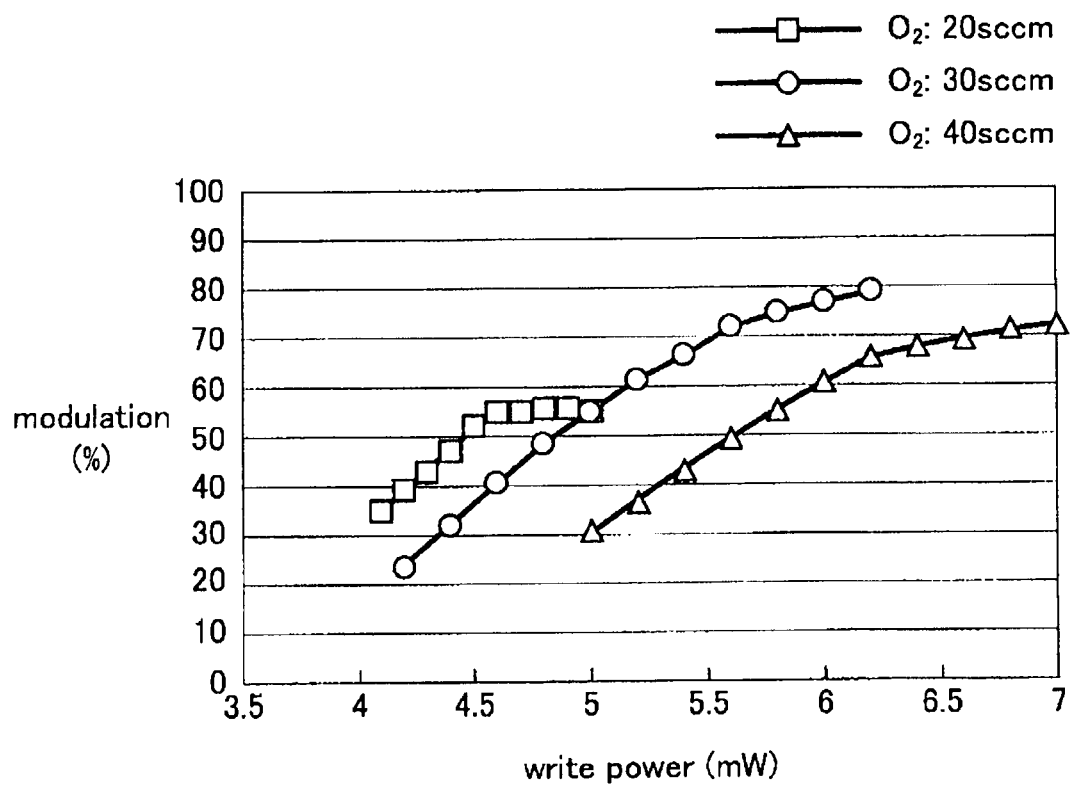
FIG. 5 is a diagram illustrating the relation between write power and modulation of each of samples.

As a measurement result, the relation between the write powers of the samples and the degree of modulation is illustrated in FIG. 5.

As illustrated in FIG. 5, it is understood that the sample in which the flow rate of oxygen is small saturates at low degree of modulation which is about 55%. On the other than, the sample in which the flow rate of oxygen is large expresses very high degree of modulation which is about 70 to 80%.

It is understood from the above that by setting the flow rate of oxygen to be high and supplying a larger amount of oxygen, the recording characteristic largely improves.

In the central track (the third track), the reflectance and transmittance of the recording layer 2 after recording were measured. The reflectance was measured by a recording/reproducing apparatus, and the transmittance in the groove surface of the substrate was measured by an ellipsometer.

Figure 6:
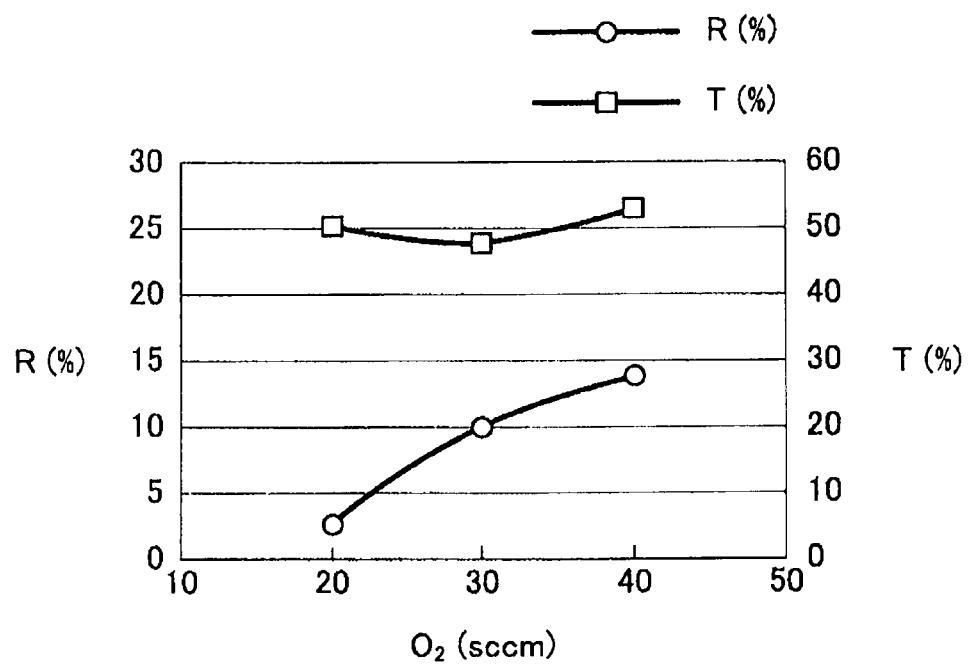
FIG. 6 is a diagram illustrating changes in reflectance R and transmittance T of a recording layer, with respect to flow rate of oxygen.

FIG. 6 illustrates, as measurement results, changes in reflectance R and transmittance T of the recording layer 2 according to the flow rate (20 to 40 sccm) of oxygen gas at the time of forming the recording layer 2.

It is understood from FIG. 6 that as the flow rate of oxygen gas ($O_2$) increases, although the transmittance does not change so much, the reflectance increases. It is therefore considered that the absorption of the recording layer 2 decreases as the amount of the oxygen gas increases and, accordingly, it reduces the jitter and increases the write power margin.

When the recording layer of the optical recording medium manufactured was actually analyzed by XPS, it was found that In existed in the form of fully oxidized $In_2O_3$ and Sn also existed in the form of fully oxidized $SnO_2$.

It was known that Pd exists in three states of Pd itself, PdO, and $PdO_2$, and the amount of oxygen in the film is equal to or more than the amount by which In and Sn are completely oxidized.

By using XPS for each of the samples 1 and 2 of the optical recording medium, the ratios of the three states of Pd, PdO, and $PdO_2$ as the states of the Pd atoms near the surface of the recording layer 2 were measured.

Table 1 illustrates the measurement results.

TABLE 1

| Sample No. | Ar (sccm) | $O_2$ (sccm) | Pd (%) | PdO (%) | $PdO_2$ (%) |
|---|---|---|---|---|---|
| 1 | 80 | 20 | 8 | 87 | 5 |
| 2 | 70 | 30 | 0 | 75 | 25 |

It is understood from Table 1 that, in the sample 2 in which the flow rate of the oxygen gas is 30 sccm, the ratio of the state of $PdO_2$ is higher than that in the sample 1 in which the flow rate of the oxygen gas is 20 sccm. The sample 2 does not have the Pd atoms which are not bonded to the oxygen atoms.

From the result, it is presumed that by controlling the bonding state of Pd and oxygen by the flow rate of the oxygen gas, the reflectance and transmittance of the recording layer can be controlled.

Although the optical recording media each including only one recording layer were manufactured in the above-described experimental examples, it is presumed that also by manufacturing an optical recording medium having two or more recording layers shown in FIGS. 2 and 3, the reflectance and transmittance of the recording layer can be similarly controlled.

The present invention is not limited to the foregoing embodiments but can have various configurations without departing from the gist of the present invention.

The invention claimed is:

1. An optical recording medium comprising:
   a substrate;
   a recording layer formed on the substrate, containing In, Sn, Pd, and oxygen, and containing oxygen atoms more than stoichiometric composition of the case where the In and the Sn are completely oxidized; and
   a light transmission layer formed on the recording layer.

2. The optical recording medium according to claim 1, wherein the recording layer includes two or more layers, and an intermediate layer is provided between the layers.

3. A method of manufacturing an optical recording medium in which a recording layer is formed on a substrate and an optical transmission layer is formed on the recording layer, comprising the step of forming the recording layer containing In, Sn, Pd, and oxygen on the substrate by sputtering while passing oxygen gas using an $In_2O_3$ target, an $SnO_2$ target, and a Pd target.

4. The method of manufacturing an optical recording medium according to claim 3, wherein flow rate of the oxygen gas is set to a range of 10 sccm to 100 sccm both inclusive.

5. The method of manufacturing an optical recording medium according to claim 3, wherein two or more recording layers are formed on the substrate while sandwiching an intermediate layer between the recording layers, and a recording layer containing In, Sn, Pd, and oxygen is formed as at least one of the two or more recording layers by sputtering while passing oxygen gas using an $In_2O_3$ target, an $SnO_2$ target, and a Pd target.

* * * * *